United States Patent
Siuta et al.

(10) Patent No.: US 12,552,206 B2
(45) Date of Patent: Feb. 17, 2026

(54) SLOW LEAK DETECTION SYSTEM FOR VEHICLE TIRES

(71) Applicant: COMPAGNIE GENERALE DES ETABLISSEMENTS MICHELIN, Clermont-Ferrand (FR)

(72) Inventors: Chase Siuta, Greenville, SC (US); Antoine Godmond, Chamalieres (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 295 days.

(21) Appl. No.: 18/256,697

(22) PCT Filed: Dec. 21, 2020

(86) PCT No.: PCT/US2020/066323
§ 371 (c)(1),
(2) Date: Jun. 9, 2023

(87) PCT Pub. No.: WO2022/139786
PCT Pub. Date: Jun. 30, 2022

(65) Prior Publication Data
US 2024/0042812 A1 Feb. 8, 2024

(51) Int. Cl.
*B60C 23/04* (2006.01)
(52) U.S. Cl.
CPC ................ *B60C 23/0476* (2013.01)
(58) Field of Classification Search
CPC ............ B60C 23/0408; B60C 23/0496; B60C 23/061; B60C 23/0494; B60C 23/0416; B60C 23/0433; B60C 23/0493; B60C 19/00; B60C 23/04; B60C 23/0462; B60C 23/041; B60C 23/20; B60C 23/0411; B60C 23/0479; B60C 23/0444; B60C 11/246; B60C 23/064; B60C 23/0488; B60C 11/24; B60C 23/007; B60C 23/062;
(Continued)

(56) References Cited

U.S. PATENT DOCUMENTS 5,900,809 A 5/1999 Hebert
10,696,108 B1 * 6/2020 Alghooneh ......... B60C 23/0401
(Continued)

FOREIGN PATENT DOCUMENTS

EP 1384604 B1 * 1/2008 ......... B60C 23/0408
EP 4306337 A1 * 1/2024 ......... B60C 23/0476
GB 2539271 B * 3/2019 ............ B60C 23/003

OTHER PUBLICATIONS

European Patent Office, International Search Report dated Jul. 21, 2021, pp. 1-13 (included), European Patent Office, Rijswijk, The Netherlands.

*Primary Examiner* — Andre J Allen
(74) *Attorney, Agent, or Firm* — Neal P. Pierotti

(57) ABSTRACT

A system for detecting leaks of tires of a vehicle is provided that includes sensors that measure pressure and temperature of the tires. The system has a processor that obtains the data from the sensors and detects a leak of one of the tires by using a natural leak model and/or a damage comparison model. The natural leak model uses temperature measurements of the tires to detect leakage of the tire which can be a slow leak of the tire. The damage comparison model detects leakage of the tire by comparing it to other tires on the vehicle.

16 Claims, 6 Drawing Sheets

(58) Field of Classification Search
CPC . B60C 23/0401; B60C 23/0413; B60C 23/06; B60C 23/043; B60C 23/0452; B60C 23/0498; B60C 23/02; B60C 23/0467; B60C 99/006; B60C 2019/004; B60C 23/0428; B60C 23/0442; B60C 11/243; B60C 23/009; B60C 23/0425; B60C 23/00354; B60C 23/004; B60C 23/045; B60C 23/0464; B60C 23/04985; B60C 23/003; B60C 23/00318; B60C 23/0403; B60C 23/0406; B60C 23/0472; B60C 23/066; B60C 23/00; B60C 23/00372; B60C 29/02; B60C 23/006; B60C 11/00; B60C 23/0454; B60C 23/044; B60C 23/0455; B60C 23/008; B60C 23/0483; B60C 25/002; B60C 23/0461; B60C 23/0474; B60C 23/0489; B60C 23/0491; B60C 29/064; B60C 23/0415; B60C 23/00363; B60C 23/0459; B60C 23/0471; B60C 23/0481; B60C 23/0476; B60C 11/0318; B60C 23/0477; B60C 2200/02; B60C 23/002; B60C 23/0437; B60C 2019/005; B60C 23/042; B60C 23/0405; B60C 23/0422; B60C 23/0423; B60C 23/0466; B60C 13/001; B60C 29/06; B60C 25/132; B60C 23/0427; B60C 23/0447; B60C 23/0449; B60C 9/18; B60C 25/00; B60C 23/065; B60C 23/0484; B60C 23/0486; B60C 19/003; B60C 13/00; B60C 23/00336; B60C 23/00345; B60C 23/08; B60C 17/00; B60C 2019/006; B60C 23/001; B60C 25/142; B60C 5/004; B60C 17/02; B60C 23/0445; B60C 23/0457; B60C 29/00; B60C 11/0083; B60C 25/145; B60C 9/02; B60C 11/0332; B60C 25/18; B60C 29/066; B60C 11/13; B60C 23/0418; B60C 23/0469; B60C 23/068; B60C 23/12; B60C 99/00; B60C 23/0432; B60C 25/138; B60C 5/14; B60C 11/03; B60C 23/005; B60C 25/005; B60C 25/007; B60C 25/0554; B60C 3/00; B60C 11/11; B60C 17/04; B60C 17/06; B60C 23/0435; B60C 23/063; B60C 23/10; B60C 25/14; B60C 29/005; B60C 29/062; B60C 99/003; B60C 11/032; B60C 11/12; B60C 13/003; B60C 15/06; B60C 19/001; B60C 23/126; B60C 23/127; B60C 23/16; B60C 29/068; B60C 3/04; B60C 9/20; B60C 11/01; B60C 11/0302; B60C 13/02; B60C 25/056; B60C 29/04; B60C 5/142; B60C 1/0016; B60C 11/0304; B60C 11/0306; B60C 19/08; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/131; B60C 23/135; B60C 23/137; B60C 23/18; B60C 25/02; B60C 11/02; B60C 17/0009; B60C 19/002; B60C 19/12; B60C 2019/007; B60C 2200/04; B60C 23/0347; B60C 25/05; B60C 5/001; B60C 5/22; B60C 1/0008; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/12; B60C 9/005; B60C 9/1807; B60C 9/28; B60C 11/0041; B60C 11/04; B60C 2009/0276; B60C 2011/0033; B60C 2011/0346; B60C 2015/0617; B60C 2015/0678; B60C 2015/0682; B60C 2200/00; B60C 23/085; B60C 25/0548; B60C 25/185; B60C 7/105; B60C 7/107; B60C 9/22; G01M 17/02; G01M 17/022; G01M 17/027; G01M 17/021; G01M 17/024; G01M 17/025; G01M 17/013; G01M 17/007; G01M 1/045; G01M 17/06; G01M 1/326; G01M 1/02; G01M 1/30; G01M 17/0074; G01M 5/0058; G01M 1/26; G01M 17/04; G01M 1/225; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 3/40; G01M 1/04; G01M 17/08; G01M 17/03; G01M 5/0091; G01M 1/365; G01M 13/04; G01M 5/0066; G01M 1/08; G01M 1/22; G01M 13/027; G01M 5/0033; G01M 1/00; G01M 15/044; G01M 17/00; G01M 3/24; G01M 3/2876; G01M 5/0075; G01M 1/06; G01M 1/12; G01M 1/122; G01M 1/24; G01M 1/32; G01M 1/36; G01M 11/081; G01M 13/023; G01M 13/025; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 1/14; G01M 1/28; G01M 3/002; G01M 3/04; G01M 7/02; G01M 9/06

USPC .................................................. 73/146–146.8

See application file for complete search history.

(56) References Cited

U.S. PATENT DOCUMENTS

| | | | |
|---|---|---|---|
| 2004/0017289 A1* | 1/2004 | Brown, Jr. | ........... B60C 23/0408 340/442 |
| 2005/0242936 A1 | 11/2005 | Watanabe | |
| 2006/0010961 A1* | 1/2006 | Gibson | ............... B60C 23/0408 73/146 |
| 2006/0122747 A1 | 6/2006 | Brown, Jr. | |
| 2017/0001482 A1* | 1/2017 | de Ruijter | ........... B60C 23/0408 |
| 2024/0142332 A1* | 5/2024 | Kuramoto | ........... B60C 23/0474 |

* cited by examiner

SLOW LEAK DETECTION SYSTEM FOR VEHICLE TIRES

CROSS-REFERENCE TO RELATED APPLICATIONS

The present application is a 35 U.S.C. § 371 application of PCT/US2020/066323 filed on Dec. 21, 2020 and entitled "Slow Leak Detection System for Vehicle Tires" and claims benefit thereto. The entire contents of PCT/US2020/066323 are incorporated by reference herein in their entirety for all purposes.

FIELD OF THE INVENTION

The subject matter of the present invention relates to a pressure loss detection system for a vehicle that is able to alert the user that one or more of the tires is experiencing pressure loss which should be addressed. More particularly, the present application involves a pressure loss detection system for a vehicle that detects leaks of the tires using both a comparison of a tire to other tires on the vehicle, and a natural pressure loss model.

BACKGROUND OF THE INVENTION

Non-pneumatic tires on vehicles need to be monitored to ensure they are properly inflated and undamaged. In addition to manual inspection of tires, it is known to provide vehicles with tire pressure monitoring systems that can automatically monitor the tires and provide this information back to the operator of the vehicle. Tire pressure monitoring systems make use of tire pressure sensors that are small, electronic devices located on the wheel rim, valve stem, or other portion of the wheel and tire that can detect the air pressure within the tire. This information may be wirelessly transmitted to a receiver in the vehicle and processed by an on-board computer which then alerts the operator as to whether one of the tires has low air pressure. This alert can be sent to the instrument cluster on the dashboard of the vehicle. Such a tire pressure monitoring system provides tire pressure information to the operator without requiring him or her to manually check the air pressure of the tire and allows for the display of tire pressure information to the driver while the vehicle is in operation. Operating vehicle tires with low inflation pressure leads to poor fuel economy, accelerated tire wear, and may cause a blow out of the tire and vehicular accident.

A slow leak of a pneumatic tire is gradual air loss of the tire over time that may be hard for the operator to detect, as opposed to a fast leak that can be felt by the driver when operating the vehicle or seen by the driver when approaching the vehicle. Slow leaks can be caused, among other reasons, by a nail puncturing the tire but still within and partially sealing the hole it caused so that air lose is gradual over time. Such a slow leak may take place for some time before the air pressure in the tire is low enough for the tire pressure monitoring system to signal an alert. This delay shortens the amount of time the operator will have to repair the slow leak. The temperature of the tire will also cause the tire pressure to change, and the tire pressure monitoring system may not be able to distinguish between pressure changes due to a leak versus temperature. Further, other events such as intentional removal of air pressure, or reinflation of the tire may not be able to be properly assessed by the tire pressure monitoring system. Although various types of tire pressure monitoring systems are known to detect air loss in tires, there remains room for variation and improvement within the art.

BRIEF SUMMARY OF THE INVENTION

The present invention provides for a system for detecting a leak that has a first sensor that obtains pressure and temperature data from a first tire of a vehicle, and a second sensor that obtains pressure and temperature data from a second tire of the vehicle. A third sensor is present that obtains pressure and temperature data from a third tire of the vehicle, and a fourth sensor that obtains pressure and temperature data from a fourth tire of the vehicle. A processor is included that obtains data from the first, second, third and fourth sensors and uses a natural leak model and/or a damage comparison model to determine if the first tire is leaking.

The natural leak model has a processor that resamples the pressure measurements of the first sensor to a fixed sample rate if the pressure measurements are not all ready in a fixed sample rate. The processor calculates a set of normalized pressure readings at different times. The processor calculates a pressure predicted for the first tire at a particular time by using the normalized pressure at a previous time, the time difference between the particular time and the previous time, and the temperature measurement of the first sensor at the particular time.

The processor can calculate a prediction interval using the pressure predicted, and if the normalized pressure at the particular time falls below the prediction interval at the particular time the processor detects a leak under the natural leak model of the first tire if this remains the case for a sufficient number of future measured normalized pressures beyond the normalized pressure at the particular time.

The damage comparison model has the processor calculating a pressure daily ratio ($r(t)$) for the first tire at different times, for the second tire at the different times, for the third tire at the different times, and for the fourth tire at the different times. The processor calculates the rate(t) for the first tire by the equation $rate(t)=P(t)*(1-r(t))$ in which $P(t)$ is the pressure of the first tire at time t and $r(t)$ is the pressure daily ratio r for the first tire at the time t. The processor calculates the rate(t) for the second tire by the equation $rate(t)=P(t)*(1-r(t))$ in which $P(t)$ is the pressure of the second tire at time t and $r(t)$ is the pressure daily ratio r for the second tire at the time t.

The processor calculates the rate(t) for the third tire by the equation $rate(t)=P(t)*(1-r(t))$ in which $P(t)$ is the pressure of the third tire at time t and $r(t)$ is the pressure daily ratio r for the third tire at the time t. The processor calculates the rate(t) for the fourth tire by the equation $rate(t)=P(t)*(1-r(t))$ in which $P(t)$ is the pressure of the fourth tire at time t and $r(t)$ is the pressure daily ratio r for the fourth tire at the time t. The processor calculates for the first tire an estimated number of days ($N_{days}(t)$) at different times before the first tire reaches a pressure threshold by the equation $N_{days}(t)=(P(t)-P_{thresh})/rate(t)$ in which Pthresh is a constant, $P(t)$ is the pressure of the first tire at time t, and $rate(t)$ is the previously calculated rate(t) for the first tire.

The processor calculates rate differences at the different times between the first tire and the second tire by the equation $diff_i(t)=rate_{est}(t)-rate_i(t)$ in which $diff_i(t)$ is the rate difference between the first and second tire at time t, $rate_{est}(t)$ is the previously calculated rate(t) for the first tire at time t, and $rate_i(t)$ is the previously calculated rate(t) of the second tire. The processor calculates rate differences at the different times between the first tire and the third tire by the equation $\text{diff}_i(t)=\text{rate}_{est}(t)-\text{rate}_i(t)$ in which $\text{diff}_i(t)$ is the rate difference between the first and third tire at time t, $\text{rate}_{est}(t)$ is the previously calculated rate(t) for the first tire at time t, and $\text{rate}_i(t)$ is the previously calculated rate(t) of the third tire. The processor calculates rate differences at the different times between the first tire and the fourth tire by the equation $\text{diff}_i(t)=\text{rate}_{est}(t)-\text{rate}_i(t)$ in which $\text{diff}_i(t)$ is the rate difference between the first and fourth tire at time t, $\text{rate}_{est}(t)$ is the previously calculated rate(t) for the first tire at time t, and $\text{rate}_i(t)$ is the previously calculated rate(t) of the fourth tire.

The processor calculates cumulative damage of the first tire in view of the second tire by the following equation:

$$D = \sum_t c * \left(\frac{\text{diff}_i(t)}{N_{days}(t)}\right)^a$$

In this equation, $\text{diff}_i(t)$ is the previously calculated $\text{diff}_i(t)$ rate difference between the first and second tire at time t, $N_{days}(t)$ is the previously calculated first tire estimated number of days ($N_{days}(t)$) at time t, c and a are constants, and the summation is performed over at least the last 1 day of time.

The processor calculates cumulative damage of the first tire in view of the third tire by the following equation:

$$D = \sum_t c * \left(\frac{\text{diff}_i(t)}{N_{days}(t)}\right)^a$$

In this equation, $\text{diff}_i(t)$ is the previously calculated $\text{diff}_i(t)$ rate difference between the first and third tire at time t, $N_{days}(t)$ is the previously calculated first tire estimated number of days ($N_{days}(t)$) at time t, c and a are constants, and the summation is performed over at least the last 1 day of time. The processor calculates cumulative damage of the first tire in view of the fourth tire by the following equation:

$$D = \sum_t c * \left(\frac{\text{diff}_i(t)}{N_{days}(t)}\right)^a$$

In this equation, $\text{diff}_i(t)$ is the previously calculated $\text{diff}_i(t)$ rate difference between the first and fourth tire at time t, $N_{days}(t)$ is the previously calculated first tire estimated number of days ($N_{days}(t)$) at time t, c and a are constants, and the summation is performed over at least the last 1 day of time. The processor compares the cumulative damage D of the first tire in view of the second tire, the first tire in view of the third tire, and the first tire in view of the fourth tire to an accumulated rate limit to detect a leak of the first tire under the damage comparison model. Also, display is present that outputs the detected leak of the first tire by the processor.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Figure 1:
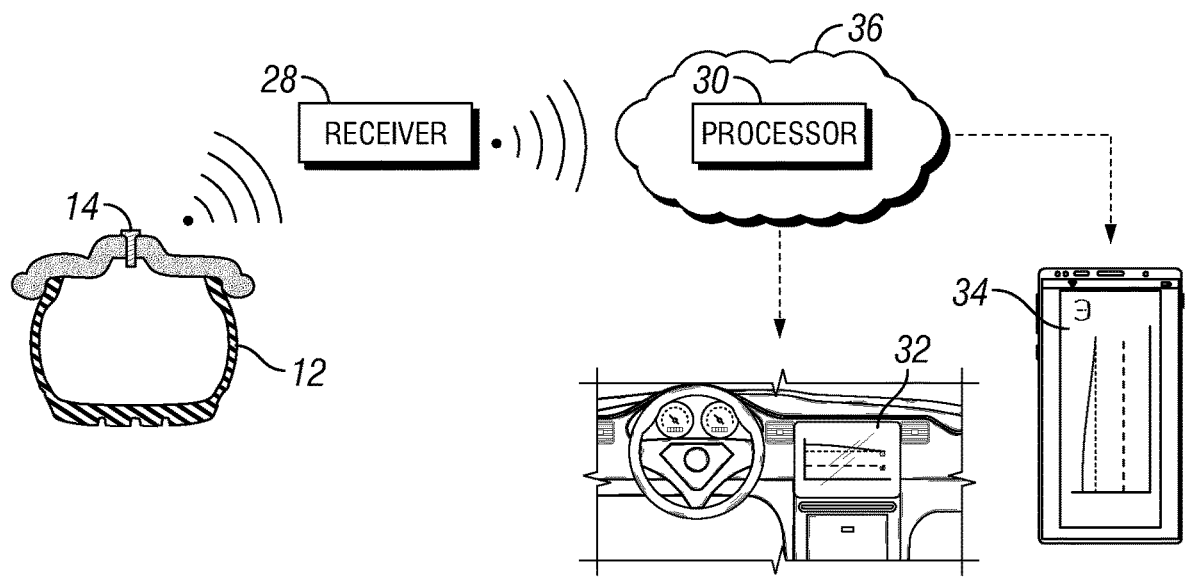
FIG. 1 is a schematic view of a system for detecting a leak of a tire.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for a leak detection system that studies the tires 12, 16, 20, 24 of a vehicle 10 and informs the user that one or more of the tires 12, 16, 20, 24 is experiencing a leak. The leak detected may be a slow leak, and if detected in the early stages may allow the user extra time to repair the leak. As such, the system seeks to inform the driver early enough in the process of a slow leak that he or she has sufficient time to repair the tire 12, 16, 20, 24 at his or her convenience instead of being stranded on the road in the case of not knowing the tire 12, 16, 20, 24 is leaking before it is too late. The system utilizes a processor 30 that obtains pressure and temperature data of the tires 12, 16, 20, 24 and processes this information using a natural leak loss model that utilizes the temperature data obtained on the tires 12, 16, 20, 24. The system could additionally or alternatively have the processor 30 conduct a cumulative damage model for each tire 12, 16, 20, 24 as compared to the other tires 12,

16, 20, 24 on the vehicle 10 and based upon this modeling inform the user that the tire 12, 16, 20, 24 is experiencing a leak. Still further, the system could use both the natural leak with temperature model and the cumulative damage model and only signal a leak when at a particular time both of these two models indicate a leak for the tire 12, 16, 20, 24.

The tire system for the vehicle 10 seeks to detect an abnormal pressure loss rate in any of the tires 12, 16, 20, 24 and provide a warning before the pressure reaches a critical level requiring immediate intervention. In addition to this output, the system could also provide the driver with a time estimate before the tire 12, 16, 20, 24 needs to be reinflated, whether through natural pressure loss of the tire over time or by an abnormal pressure loss event such as a puncture that could be a slow leak. The system may operate over two time scales in which the first has a long time frame in which small pressure deviations are detected outside of an expected range. The shorter time frame in which the tire system operates is geared towards detection of rapid pressure events.

FIG. 1 shows embodiment of the tire system in which the first tire 12 is measured by a first sensor 14 that is mounted into a wheel rim that carries the first tire 12. The first sensor 14 measures pressure and temperature in the cavity between the wheel rim and the first tire 12. Information obtained by the first sensor 14 may be transmitted by it to the receiver 28 that can be carried on the vehicle 10. This transmission may be through a wireless transmission or could be a hard wired transmission in some instances. The receiver 28 in turn may transmit its data wirelessly to a processor 30 and/or data storage 36. These elements 30, 36 may be located in the cloud or other area remote from the vehicle and need not be carried on the vehicle. The processor 30 can process the information received from the receiver 28 and may use it to determine whether the tire 12 is leaking. Information from the first sensor 14 could be stored on the data storage 36 and the processor 30 could draw on data in the data storage 36 to make the leakage determination that can include data from not just the first sensor 14 but from other sensors. Once the processor 30 processes data, it may return this information to the user in various means. In one instance, the output from the processor 30 may be sent to a vehicle display 32 that is located in the vehicle 10 so the operator can receive this information. Additionally, or alternatively, the processor 30 can send the information to a hand-held display 34 such as a cell phone so the user can obtain the output from the processor 30.

Figure 2:
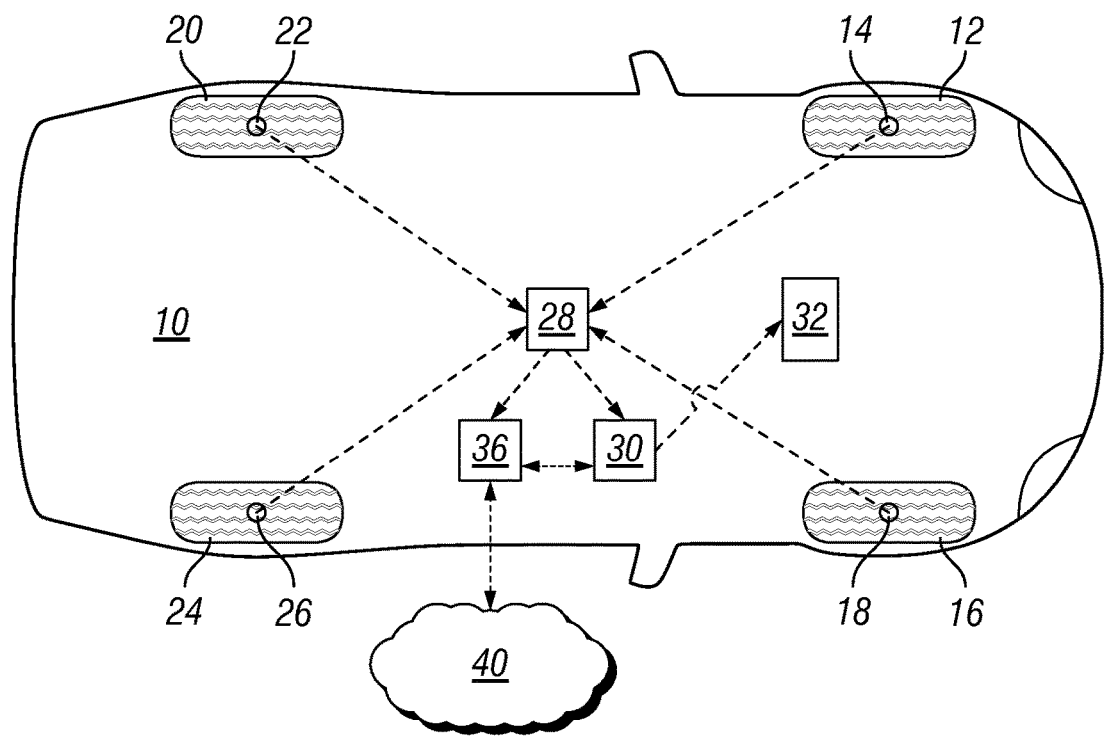
FIG. 2 is a schematic view of a system for detecting a leak of a tire.

The tire measurement system requires both air pressure of the tires 12, 16, 20, 24 and air temperature of the tires 12, 16, 20, 24 to determine whether there is a leak in some embodiments. FIG. 2 shows a vehicle 10 with the first, second, third and fourth tires 12, 16, 20, 24 each having their own sensor noted as first, second, third and fourth sensors 14, 18, 22, 26. The data from these sensors 14, 18, 22, 26, which can be pressure and temperatures of the tires 12, 16, 20, 24, is communicated to a receiver 28 that is located on the vehicle 10 and within range, and that has the ability to transmit the received data to a data storage 36 and/or processor 30. The processor 30 is a computer processor and may use the received data to determine whether a leak of one of the tires 12, 16, 20, 24 is taking place. The processor 30 may draw data from the data storage 36 and/or directly from the receiver 28 to use to make this determination. The processor 30 can have its own internal data storage that allows it to know what program to execute in order to process the data. The processor 30 could also obtain data or a program from the data storage 36 to execute. Once the processor 30 processes the data and determines leak information of the tires 12, 16, 20, 24 it may transmit this output for display to the user to the vehicle display 32 that can be located in the vehicle 10. The data could also be transmitted by the data storage 36 that is onboard the vehicle 10 to a data storage 40 that is remote from the vehicle 10 through a wireless transmission. The data storage 40 may simply store the data from the tires 12, 16, 20, 24 or may include a processor that could likewise analyze the data to determine if a leak is occurring. The data storage 36, 40 may be a computer with a processor and a memory and the ability to store information or can simply be an element that stores information like a hard drive or storage device on the cloud.

Data from the sensors 14, 18, 22, 26 is stored in the data storage 36 and obtained by the processor 30 or is directly sent to the processor 30 or finds its way to the processor 30 through a combination of both. The processor 30 can be a processor onboard the vehicle 10 or can be remote from the vehicle 10. The processor 30 is capable of processing the received data to determine whether a slow leak is present in one of the tires 12, 16, 20, 24. The processor 30 may be a computer that has a long and short term memory and data storage capability. As such, it is to be understood that as used herein that the processor 30 is capable of not only executing instructions according to a program to process data but is also capable of storing data as well either in short term memory or in long term storage such as via a hard drive or other data storage component.

Figure 3:
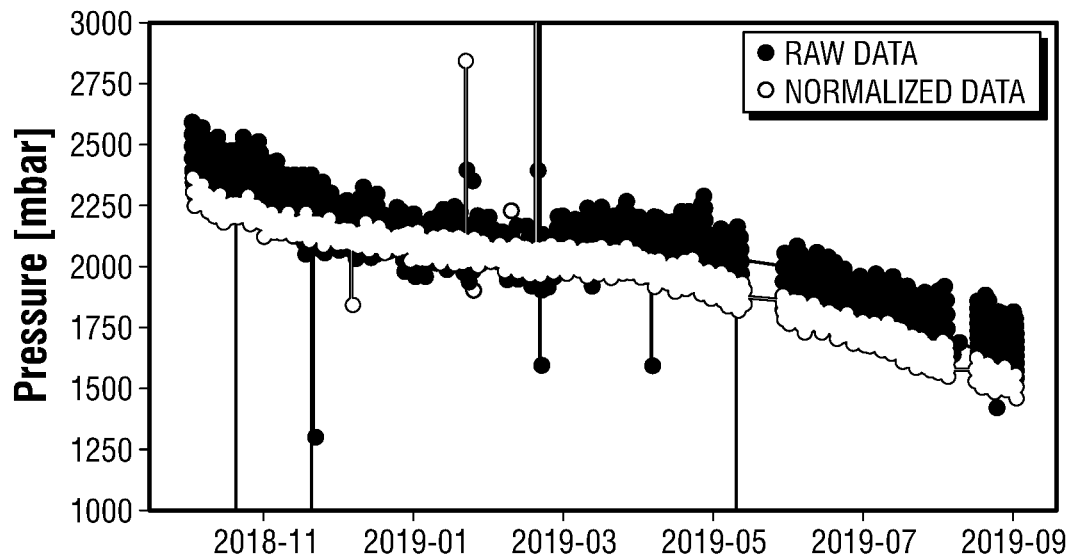
FIG. 3 is a graph of raw pressure data and normalized pressure data.

The data may go through pre-processing in order to clean the data for subsequent processing steps. The first thing that the processor 30 may do is resample the data to a fixed sample rate. This can be accomplished by setting a sample rate for the data from the various sensors 14, 18, 22, 26 to the same time interval and using the median value of the data over this time variable to be the assigned reading for that particular sensor 14, 18, 22, 26. This cleaning can be used when the sensors 14, 18, 22, 26 return different numbers for the same time period between them. For instance, over the course of a minute, the first sensor 14 may return pressure readings of 2.1 bar, 2.2 bar, 2.4 bar, 2.5 bar, and 2.7 bar. The processor 30 can determine the mean of this data set as 2.4 bar and set the reading for the first sensor 14 as 2.4 bar per minute. The temperature readings of the first sensor 14 can be processed in a similar way to yield a data set of first sensor 14 temperatures per minute. The pressure and temperature data measured from the other sensors 18, 22, 26 can be resampled and set to a median value of data over each minute so that all of the sensors 14, 18, 22, 26 yield data sets that are over the same amount of time. The resampling of data in this manner improves the efficiency of the data analysis. FIG. 3 is a graph showing the raw pressure data from one of the sensors over time, along with showing the normalized pressure data after such normalization.

Most of the daily variation of pressure within the tires 12, 16, 20, 24 is due to temperature swings from day to night and from when the vehicle 10 is driving and is at rest. The temperature readings of the sensors 14, 18, 22, 26 are used in the following equation in which $T_{cold}$ is 17 degrees Celsius:

$$LP_{cold} = P_{measured} * \frac{T_{cold} + 273.15}{T_{measured} + 273.15}$$

For example, if the data returned is a measured temperature of 25 degrees Celsius ($T_{measured}$) and the measured pressure returned is 2250 mbar ($P_{measured}$), then the $P_{cold}$ would be calculated as 2250 mbar*((17+273.15)/(25+273.15))=2250 mbar*(290.15/298.15)=2250 mbar*0.973=2189.6 mbar. The benefit of normalizing the temperature based upon the ideal gas law is that it requires no prior knowledge about the measurements. The drawback of this temperature normalization is that it ignores the moisture content in the air and variations of the locations of the sensors 14, 18, 22, 26 in the tires 12, 16, 20, 24 which can change the apparent sensitivity to temperature. The resampled pressures in the previous step can be the pressures used for $P_{measured}$, and in some instances, the processor 30 could also resample the temperatures in the same way as the pressures were resampled and this resampled temperature can be used for $T_{measured}$ in the equation.

Figure 4:
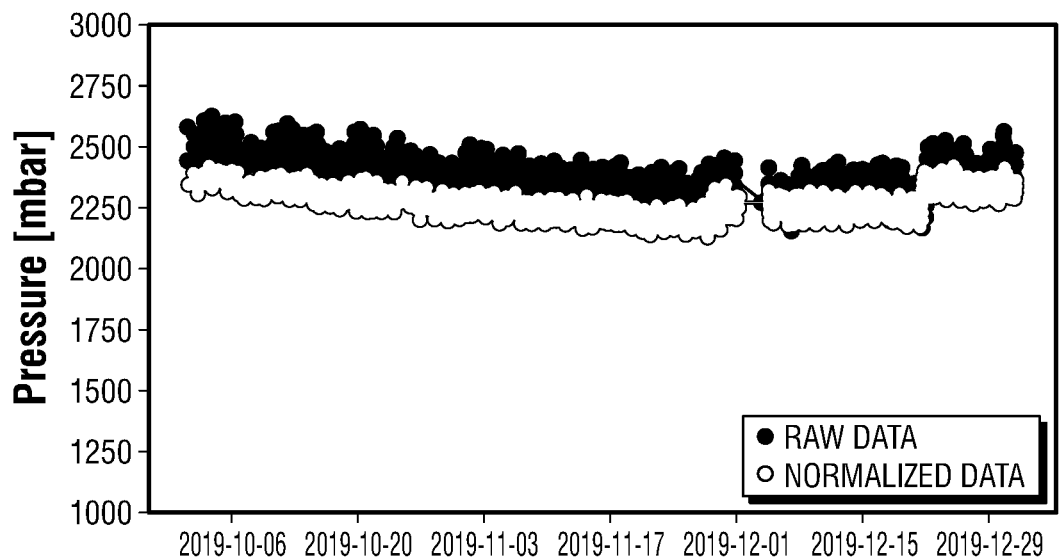
FIG. 4 is a graph with data different from FIG. 3 that shows raw data and normalized data with outliers removed.

The processor 30 may next perform a processing step in which outliers are dropped. Outliers may be dropped in a variety of manners, and one such manner may involve the removal of data which is greater than 0.1 bar away from the datapoints on either side to arrive at an approximately 99% confidence interval. If such outlier is the first or last data point in a series, it is not dropped. FIG. 4 shows a dataset with different data from that previously shown in FIG. 3, but with the outliers removed in FIG. 4. The results of the aforementioned pre-processing steps by the processor 30 provide a dataset for each sensor 14, 18, 22, 26 that is cleaner than the raw data and with a standard deviation on any given day that is approximately one half that of the raw data. In some embodiments, the standard deviation may drop from around 40 mbar for data set that is not pre-processed, to around 20 mbar for a data set that is filtered.

The datasets provided by the sensors 14, 18, 22, 26 may then be processed in order to determine whether a rapid leak and/or slow leak of one of the tires 12, 16, 20, 24 is taking place. However, the processor 30 must be able to discount certain situations within the set of data which may mask or obscure the fast and/or slow leak. For example, the tires 12, 16, 20, 24 may experience natural leakage of air from within through the inner liner which is slow in the wintertime and faster in the summer. Tires that experience natural air leakage is consistent for each one of the tires 12, 16, 20, 24. Also, reinflation of tires 12, 16, 20, 24 may be performed by the owner and can show up in this data. Reinflation of tires can cause the pressure to increase from one day to the next, and reinflation is often consistent in trend for each wheel position although not in magnitude. Further, the pressure dataset can have deflation of the tires 12, 16, 20, 24 in it which can be due to pressure checks of the tires 12, 16, 20, 24 or through their manual deflation. Deflation often, although not always, impacts all of the tires 12, 16, 20, 24 on the vehicle 10 at the same time and could cause false positives for leak detection. Finally, the dataset of the pressure can show leaks of the tires 12, 16, 20, 24 which are abnormal changes in pressure but not reflected in all wheel positions. The shape of a leak in the graph is often linear, a decreasing exponential, or an increasing exponential. The processor 30 needs to identify leaks and needs to discount data in the dataset that is from natural leaking, reinflation, or deflation.

The processor 30 may then process the datasets to determine if one of the tires 12, 16, 20, 24 is having a rapid leak. The processor 30 may calculate the daily pressure ratio which compares the pressure currently measured to the median pressure of the previous day by using the following equation:

$$r = \frac{P(t)}{\text{median}([P(t - \Delta t); P(t)])}$$

Figure 5:
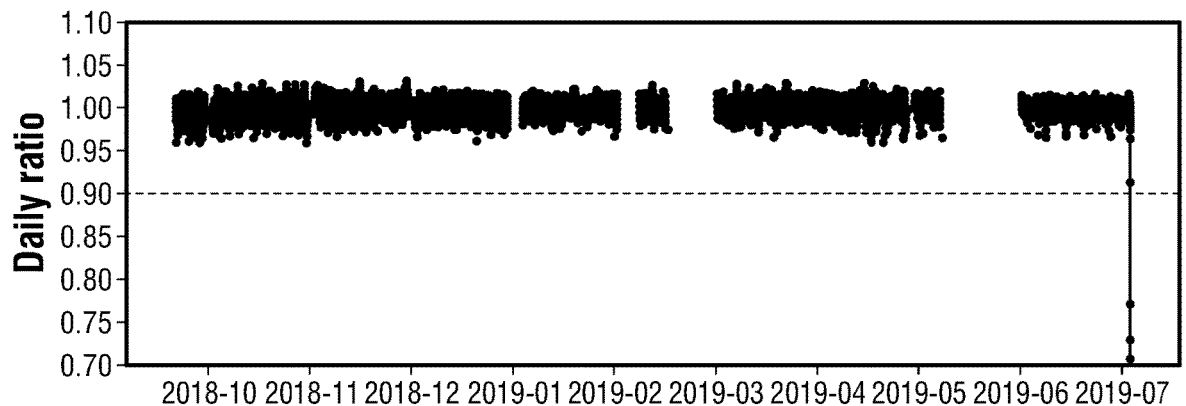
FIG. 5 is a graph of a daily ratio of a tire over time.
Figure 6:
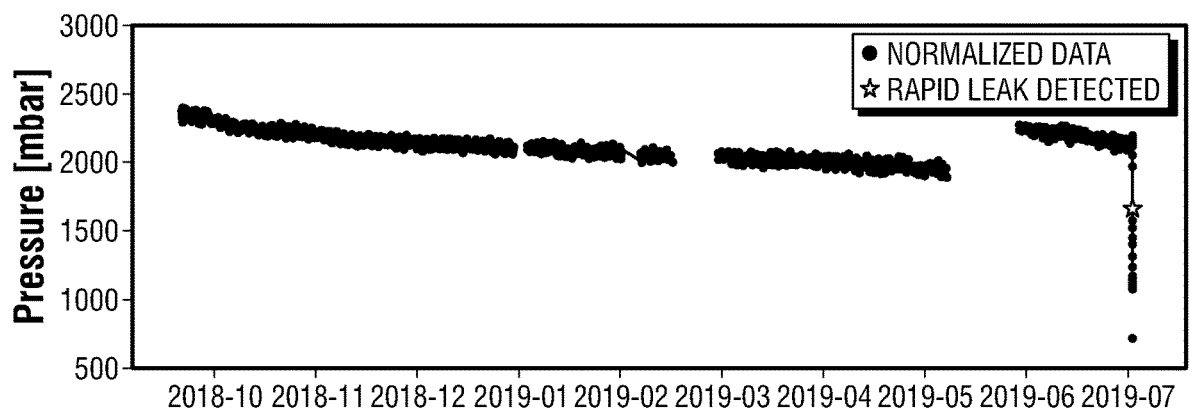
FIG. 6 is a graph of the measured pressure over the same time as that of FIG. 5 showing a pressure loss at a certain point in time.

Here, the P(t) is the pressure measured at time t, the $\Delta t$ is the change in time and in one example is 1 day of time. The [P(t–$\Delta t$); P(t)] are all of the pressures measured between time t–$\Delta t$ and t. For example, within the last day if pressure readings of 2.40 bar, 2.42 bar, 2.40 bar, 2.5 bar, 2.5 bar, and 2.5 bar were measured by the first sensor 14, then the median would be 2.45 bar. If the measured P(t) at the point in time in question is 2.5 bar, then r=2.5 bar/2.45 bar=1.02. The daily ratio r of a tire that is leaking rarely or is not leaking is between 0.95 and 1.05. As such, a warning is triggered for rapid leaks when two consecutive data points have a daily ratio value that drops below the detection limit. In some embodiments, the processor 30 may return a rapid leak warning when the r value is below 0.90 for two consecutive data points. FIG. 5 shows the calculated r value for a sample data set for the first sensor 14 over the course of several months. In July of 2019, the r value drops below 0.90 for two consecutive data points indicating that a rapid leak of the first tire 12 is taking place. FIG. 6 shows the pressure sensed by the first tire 12 over this same time period that verifies the pressure loss is taking place. FIGS. 5 and 6 are for the first sensor 14 and first tire 12 and do not show data for the other sensors 18, 22, 26 and tires 16, 20, 24.

In addition to detecting rapid leakage of the tires 12, 16, 20, 24, the processor 30 may also analyze the dataset to determine whether the tires are experiencing slow leaks. In order to detect whether slow leaks of the tires 12, 16, 20, 24 are taking place, the processor leverages two different schemes and combines them to achieve a robust detection. The first method is to compare the measured pressure to the pressure predicted by a physical model of the natural pressure loss over time. This pressure loss rate is a function of the current pressure in the tire 12, 16, 20, 24 and the temperature. The second method is to compare the pressure loss rate of each tire, such as tire 12, to identify when the pressure loss of this tire 12 becomes significantly different than the other tires 16, 20, 24. The second method can also be executed for the other tires 16, 20, 24 as compared to the other three on the vehicle 10. The processor 30 may use both of these methods to determine that a tire 12, 16, 20, 24 is indeed leaking.

Figure 7:
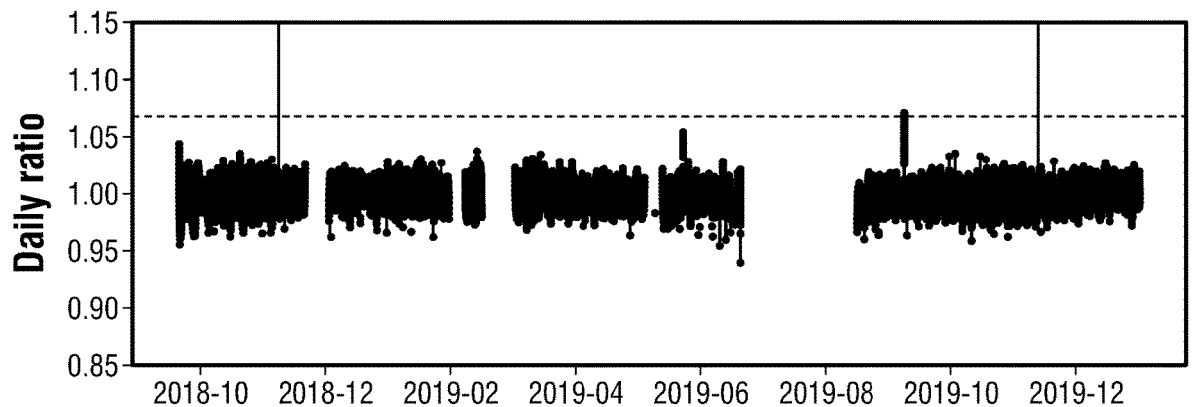
FIG. 7 is a graph of a daily ratio of a tire over time.
Figure 8:
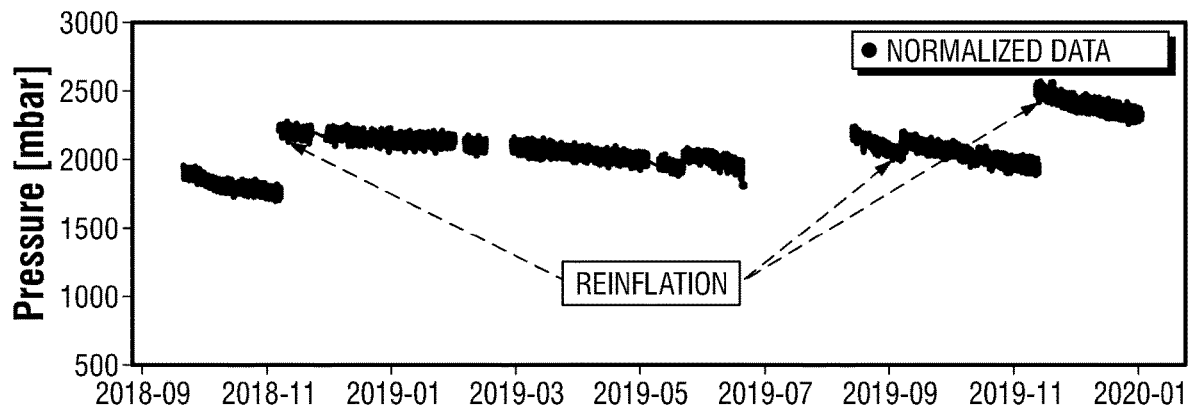
FIG. 8 is a graph of the measured pressure over the same time as that of FIG. 7 showing the normalized pressure increasing at reinflation events.

In order to execute the determination of the measured pressure to the pressure predicted by a physical model of the natural pressure loss over time, the processor 30 may first take out any rapid leak data as previously calculated from the dataset. The dataset can be segmented in that if the delta time between two data points is greater than 10 days, then this data becomes a new segment group. Also, if a reinflation of the tire 12, 16, 20, 24 is detected, then this data becomes a new segment group. As previously discussed, reinflation occurs when someone adds air or nitrogen to the tire. The daily ratio r that was previously calculated is looked at again by the processor 30 in this step to detect reinflation. A reinflation of the tire 12, 16, 20, 24 occurs when consecutive values rise above the inflation limit which can be set at 1.065 in one embodiment. If the dataset is provided so that there is no data the previous day, an additional rule can be utilized by the processor 30 to detect reinflation. Here, if the pressure difference between two consecutive data points is above 1.25 bar, the processor 30 detects a reinflation. FIG. 7 shows a calculated daily ratio r over time, and the horizontal reinflation line of 1.065 bar is displayed in the graph. The daily ratio r over time exceeds the reinflation line of 1.065 bar three times on this graph as shown which indicates that reinflation in the tire 12 is taking place at these three moments in time. FIG. 8 shows the normalized pressure in mbar over time for the tire 12 of FIG. 7 so that one can look at the pressure readings to verify that the reinflation is in fact taking place at these three moments in time. As shown, the normalized pressure increases at the three points in time noted on the FIG. 7 graph indicating that reinflation has occurred at these moments.

Figure 9:
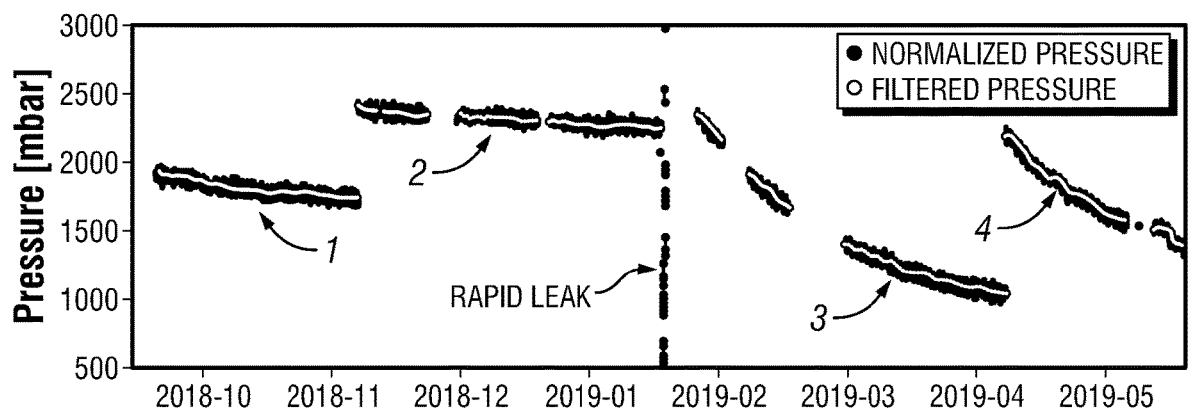
FIG. 9 is a graph showing normalized pressure and filtered pressure of a tire over time in which reinflation events and a rapid leak show up in the data.

Next, with the rapid leak data removed and the datasets segmented into groups based upon reinflation, the processor 30 can process the normalized pressure in each one of the segments. FIG. 9 includes new data that is not the same as previous data to illustrate this next step in the process. In FIG. 9, the normalized and filtered pressure over time is shown. The processor takes the normalized pressure and calculates a rolling average and then assigns this average for each day in FIG. 9 as the filtered pressure. Taking the rolling average of the normalized pressure reduces the noise in the datasets and produces a smoother curve as shown in FIG. 9 upon comparing the normalized pressure to the filtered pressure. To calculate a rolling average to obtain the filtered pressure, the processor 30 may for any one day data point take all of the normalized pressures for the prior 24 hour period and average them together and this average becomes the filtered pressure for that one day data point. For example, if the processor 30 seeks to determine the filtered pressure for Jan. 11, 2018, then it takes the normalized pressure readings from the prior 24 hour period which may be 1.65 mbar, 1.65 mbar, 1.70 mbar, 1.71 mbar, 1.66 mbar, and 1.68 mbar and the average of these six readings is 1.67 mbar. On the chart, 1.67 mbar is then assigned as the filtered pressure for Jan. 11, 2018. There are 4 segmented datasets noted in FIG. 9, and a rapid leak is present between data sets 2 and 3. The rapid leak data is removed from the processing. A reinflation of the tire 12 takes place between datasets 1 and 2, and a reinflation also takes place between datasets 3 and 4.

Now that the processor 30 has established a cleaned and segmented dataset, a natural leak rate model can be applied by the processor 30 to estimate how the tire 12 is experiencing natural leaking changes with ambient conditions. The tire 12 will lose air pressure naturally over time through the normal occurrence of air permeating through the tire 12 and exiting. This natural loss of air over time is not to be confused with a slow leak of the tire 12 but is instead air loss that occurs through the inner liner of the tire 12. The natural rate of air loss in some instances may be at a rate of 1 to 5 mbar of pressure per day. This natural rate of air loss is dependent upon the temperature and pressure of the tire 12. To account for this dependency upon temperature and pressure, the processor 30 utilizes a functional exponential model that considers thermomechanical functioning of the tire 12 and the physiochemical mechanisms of diffusion-absorption of the air constituents of the envelope cavity. With this natural leak model, the pressure at any given time accounting for natural pressure loss may be ascertained by the processor 30. The natural leak model uses the following equation:

$$P predicted(t) = P(t - \Delta_t) * (1 - \alpha(t) * \Delta_t)$$

$$\text{with } \alpha(t) = \frac{1}{\tau_0} * e^{-\frac{E}{T(t)+273.15}}$$

Here, $P_{predicted}(t)$ is the pressure at a given time. $P(t-\Delta_t)$ is the pressure at the previous data point with $\Delta_t$ the delta time between the new data point and the previous data point. The normalized pressure is the pressure values that are used. $T(t)$ is the temperature at a given time. E and $\tau_0$ are constants that depend upon the constitutive characteristics of the wall of the envelope of the tire 12, and stated another way are constants that depend upon the geometry of the tire 12 and the permeability of materials making up the tire 12. These parameters are tire 12 dependent, but values of E=5800 K (E must be between 5000 K and 6000 K to be near activation energies of the inner liner of the tire 12) and $\tau_0=\frac{1}{3}$ are good approximations for a large range of standard tire designs.

Figure 10:
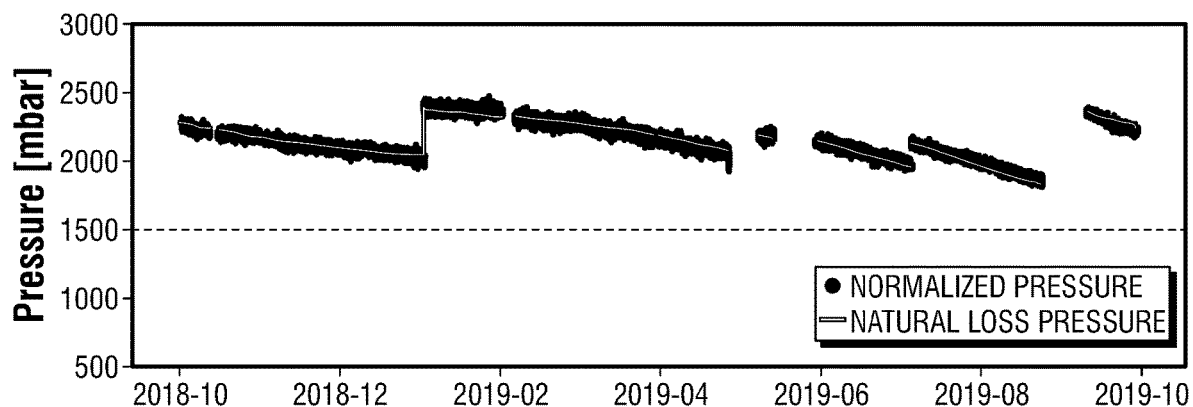
FIG. 10 is a graph of segmented data sets that show normalized pressure over time and the predicted natural loss pressure over time.

FIG. 10 shows a series of segmented data sets in which the normalized pressure is displayed per time. FIG. 10 also shows the natural loss pressure ($P_{predicted}(t)$) for each of these times and results in a much tighter fit than the normalized pressure. The calculation of $P_{predicted}(t)$ can be shown with an example. The first sensor 14 measuring the first tire 12 provides both a temperature and a pressure reading for each time. One of the segmented data sets, for example segmented data set #1 as shown in FIG. 1, may have its data points converted over from normalized pressure to the natural loss pressure as illustrated. At a given time point in the first data set, the $T(t)$ of that particular given time point is provided by the first sensor 14 and it may be 32 degrees Celsius in this example. The parameters E=5800 K (equivalent to 5526.8 Celsius) and $\tau_0=\frac{1}{3}$ are set as described above. Setting these numbers into the above equation for the pressure loss rate $\alpha(t)$ the equation reads $\alpha(t)=1/(\frac{1}{3})* e^{-(5526.85/(32+273.15))}=3*e^{-18.11}=3*1.36435\times10^{-8}=4.093\times10^{-8}$.

With the pressure loss rate calculated, the $\Delta_t$ is 1 minute which is the time between sensor 14 readings. The pressure one minute ago from the pressure point being calculated is the previous pressure and it is included in the equation as $P(t-\Delta_t)$ and in our example is 2220 millibar. Solving for $P_{predicted}(t)=2220$ millibar*(1−4.093×10−8*1)=2220 millibar*(0.9999999591)=2219 millibar. The natural loss pressure for all of the data points can be computed for all of the segments of data and this is shown in FIG. 10 for each one of the segments. The data in FIG. 10 is the normalized pressure and the adjusted natural loss pressure for one of the tires 12 and does not show these variables for every one of the tires 12, 16, 20, 24 of the vehicle 10.

With the $P_{predicted}(t)$ calculated the natural pressure loss for each segment can be looked at to determine whether the tire 12 is experiencing a slow leak, and this leak detection is the comparison of the first sensor 14 data to a model. A 99% prediction interval is established around the pressure predicted by the natural pressure loss model. This 99% interval is set up with upper and lower bounds by way of the following equation:

$$IP_{99\%}(t)=[P_{predicted}(t)-2.576*\sigma; P_{predicted}(t)+2.576*\sigma]$$

Figure 11:
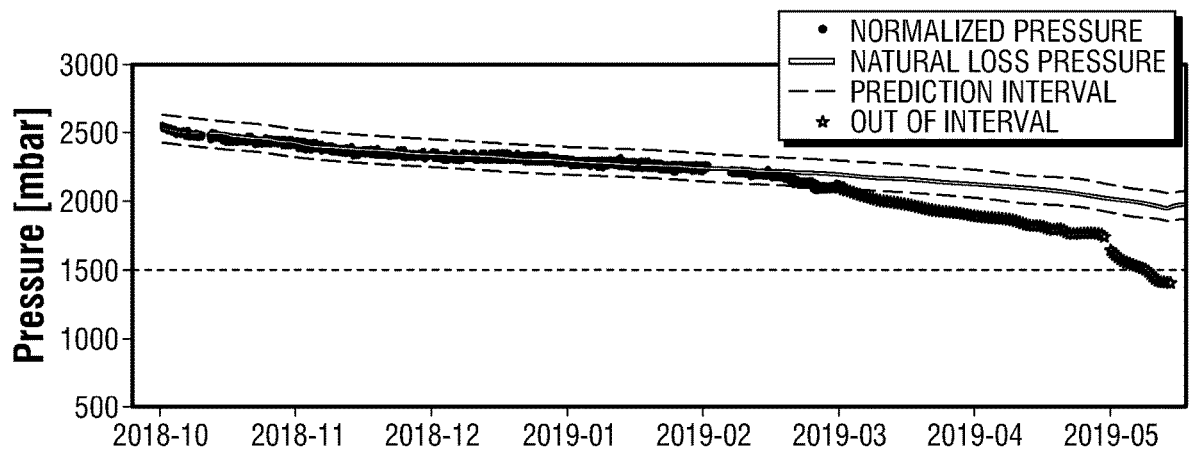
FIG. 11 is a graph of one of the segments of data that shows the normalized pressure, the natural pressure loss, and the prediction interval.

In order to eliminate noise out of the interval, the standard deviation a may be overvalued, so the processor 30 may set the standard deviation a to be equal to 40 mbar. The standard deviation a can be different in other embodiments. This is the standard deviation of the uncorrected pressure measured by the sensor 14. The prediction interval allows for readjustment of the model. In this regard, if 20 consecutive data points are out of the top of the interval, the processor 30 will restart the model to shift the prediction interval back up to the real inflation pressure. The second point the prediction model allows is to have the processor 30 predict if the tire is losing pressure more quickly than expected. In this regard, if 20 consecutive data points are out of the bottom of the interval, the processor 30 at this point in the algorithm detects a region of potential leaks. Although 20 consecutive data points is given as an example, any number can be used in other embodiments. If the $P_{predicted}(t)$ calculated for a specific time by a specific sensor 14 is 2219 millibar, then $IP_{99\%}(t)=[2219-(2.576*40); \quad 2219+(2.576*40)]=[2219-103.04; 2219+103.04]=2115.96$ millibar; 2322.40 millibar. The bottom of the interval at this point in time would be 2115.96 millibar, and the top of the interval at this time would be 2322.40 millibar. FIG. 11 is a graph of one segment of data as previously discussed, but with new data not shown before. On FIG. 11, the pressure is on the Y axis and time is on the X axis for one segment of the measured data. The normalized pressure, for example those pressure readings calculated with respect to discussion concerning FIG. 9 and the rolling average, is plotted on the graph over time. The calculated $P_{predicted}(t)$ natural loss pressure is likewise plotted on the graph over time. The $IP_{99\%}(t)$ prediction interval that has the upper and lower bounds is also plotted on the graph over time as shown. The normalized pressure is within the prediction interval until about March 2019 at which time it falls below the lower limit of the prediction interval and is out of range. The normalized pressure below the lower limit of the prediction interval is noted by "out of interval" in FIG. 11. If the normalized pressure is below the lower limit, the processor 30 detects a leak of the tire 12. Again, the chart of FIG. 11 is for only one of the sensors 14 of the vehicle 10 and is for only one segment of data of that sensor 14 for the vehicle 10. The other tires 16, 20, 24, and their segments of data, can be evaluated in a similar manner to determine if they are or are not likewise experiencing a slow leak.

The above described actions by the processor 30 result in a prediction of slow leaks of the tires 12, 16, 20, 24 using a natural leak model. However, the use of this slow leak model may result in the processor 30 incorrectly detecting leaks if the model has a poor starting point. To avoid false positives by the vehicle 10 monitoring system, this natural leak model should be combined with a comparison of the neighboring tires 12, 16, 20, 24 on the vehicle 10. In this regard, the first tire 12 would be compared to the other three tires 26, 20, 24 on the vehicle 10. The second tire 16 would be compared to tires 12, 20, 24, and third tire 20 would be compared to tires 12, 16 and 24. Also, fourth tire 24 would be compared to tires 12, 16, 20.

To compare the tires 12, 16, 20, 24 the rate at any time for any of the tires 12, 16, 20, 24 should be calculated. To calculate this rate, it is assumed the pressure loss is linear and the following equation is used:

$$\text{rate}(t) = \frac{P(t) - P_{thresh}}{N_{days}(t)}$$

The rate(t) is the rate at any given time, and F(t) is the pressure at a given time. $P_{thresh}$ is the pressure threshold and is a constant. In the case of passenger car tires, $P_{thresh}$ may be set at 1500 millibar. The variable $N_{days}(t)$ is the estimated number of days until the tire will reach $P_{thresh}$.

In order to solve for the rate(t), the daily ratio r previously determined can be used, and the term 1−r(t) expresses the percent change to the pressure in a day of time. The term P(t) is the pressure at a given time. P(t) is the actual measured pressure, and r(t) is the daily ratio r as previously calculated. In this manner, the rate(t) can be expressed as follows:

$$\text{rate}(t)=P(t)*(1-r(t))$$

In one example, if the pressure at a time t is 1800 millibar, and the previously calculated daily ratio r is 0.99, then the rate(t) can be calculated as 1800 millibar*(1−0.99)=1800 millibar*(0.01)=18. Solving for the rate(t), and having the $P_{thresh}$ set as a constant, allows the processor 30 to use the previous equation to solve for $N_{days}(t)$ as follows:

$$N_{days}(t) = \frac{P(t) - P_{thresh}}{\text{rate}(t)}$$

In this regard, the processor 30 can then compute the remaining days ($N_{days}(t)$) required to reach $P_{thresh}$ at any given time. For example, if rate(t) is 18, and if $P_{thresh}$ is 1500 millibar, and if the pressure at time t is 1800 millibar, then $N_{days}(t)=(1800-1500)/18=300/18=16.66$.

The processor 30 is thus able to solve for rate(t) for each one of the tires 12, 16, 20, 24 at the various times, normally taking a measurement every minute the vehicle 10 is being operated. Measurements may not be taken when the vehicle 10 is not being operated. The processor 30 may then calculate the rate difference between each tire 12, 16, 20, 24 by using the following equation:

$$\text{diff}_i(t) = \text{rate}_{est}(t) - \text{rate}_i(t)$$

In this calculation, $\text{rate}_{est}(t)$ is the rate(t) for the tire in question, such as the first tire 12, and $\text{rate}_i(t)$ will be the rate(t) of the second tire 16 to which the first tire 12 is compared. These rates were those as previously calculated. As an example, if the rate at a particular time t is 18 for the first tire 12, and the rate at the same time t for the second tire 16 is 17.5, then the rate difference at time t between the first tire 12 and the second tire 16 is $\text{diff}_i(t)=18-17.5=0.5$. This rate difference is calculated for the first tire 12 versus the second tire 16 for all of the measurements made within the last 5 days. The processor 30 will also make this same rate difference calculation for the first tire 12 versus the third tire 20 for each measurement over the last 5 days, and will make this same rate difference calculation for the first tire 12 versus the fourth tire 24 for each measurement taken over the last 5 days. The processor 30, then working with just the $\text{diff}_i(t)$ data for the first tire 12 versus the second tire 16 calculates a cumulative damage model for these rate differences over the last 5 days by way of the following equation:

$$D = \sum_t c * \left(\frac{\text{diff}_i(t)}{N_{days}(t)}\right)^a$$

In this equation, c is equal to $\frac{1}{10}$ and is a constant, and a is also a constant and is equal to 0.4. The $\text{diff}_i(t)$ is one of the previously calculated rate differences for the first tire 12 versus the second tire 16, and the $N_{days}(t)$ is the previously calculated remaining days at time t to reach the time threshold. For example, if $\text{diff}_i(t)$ is 0.5 and $N_{days}(t)$ is 243 days, then the calculation will be $(\frac{1}{10})*(0.5/243)^{0.4}=(\frac{1}{10})*(0.00205761)^{0.4}=(\frac{1}{10})*(0.08420642)=0.00842064$. The processor 30 will then move to the next time, which will usually be 1 minute, and perform this same calculation again with the $\text{diff}_i(t)$ and $N_{days}(t)$ values of that next time to achieve another number. All of the times, with their corresponding values $\text{diff}_i(t)$ and $N_{days}(t)$, within the last 5 days are calculated. All of these numbers are added up to yield D for the first tire 12 compared with the second tire 16. The system will then compare the cumulative damage D against an accumulated rate limit to see if D exceeds this accumulated rate limit. In some embodiments, the accumulated rate limit is 1. If D is greater than 1, then there is a significant difference between the first tire 12 and the second tire 16. Although described as performing the summation over the last 5 days, in other embodiments the summation can be performed over at least the last one day, at least the last 2 days, at least the last 3 days, at least the last 4 days, at least the last 5 days, or for over the last 5-10 days in accordance with different exemplary embodiments.

The processor 30 may then run the same calculation to determine D for the first tire 12 in view of the third tire 20. In this regard, the $\text{diff}_r(t)$ used is the rate difference between the first tire 12 and the third tire 20 at time t, and the $N_{days}(t)$ is the Number of days to reach the threshold for the first tire 12 at time t. These values are entered into the above equation, and the number found. The calculation is repeated for the next time t using the $\text{diff}_r(t)$ and $N_{days}(t)$ at that time t, and likewise again until all of the measurements taken within the last 5 days are tabulated. All of these numbers are added up together to result in D for the first tire 12 in view of the third tire 20. This number D is then compared to an accumulated rate limit set for the first tire 12 in view of the third tire 20. In some cases, the accumulated rate limit may be 1. If D is greater than 1, then a significant difference is noted between the first tire 12 and the third tire 20.

The processor 30 may repeat this process using the values for the first tire 12 versus the fourth tire 24 to arrive at a D for the first tire 12 in view of the fourth tire 24. Again, if this particular D is greater than an accumulated rate limit for the first and fourth 12 and 24 which could be 1 in some instances, a significant difference is noted between the first and the fourth tires 12, 24.

The aforementioned calculation D is a cumulative damage model that addresses damage caused to a material. As physical events follow one another, the ability of a physical system to withstand them decreases and the damage suffered increases. In this regard, the cumulative damage model defines the damage as the number of repetitions of the event damaging the object on a period. In the described system, the event damaging is the rate r difference between the tire in question and its neighboring tire. If the accumulated rate difference damage D crosses the value 1, then the processor 30 considers that there were enough events damaging to confirm a significant difference between two tires.

The accumulated rate difference damage D is calculated as previously described at each time t for the first tire 12 versus the second tire 16. The same process allows for the calculation of the accumulated rate difference damage D for the first tire 12 versus the third tire 20, and for the first tire 12 versus the fourth tire 24. As the processor 30 moves through the neighbor tire comparison the processor 30 will detect a leak of the first tire 12 if the accumulated rate difference damage D is above 1 for at least two of the neighboring tires 16, 20, 24. In this regard, if the first tire 12 versus second tire 16 has a D of 1.1, and the first tire 12 versus the third tire 20 has a D of 0.03, and the first tire 12 versus the fourth tire 24 has a D of 0.05, then only 1 of the accumulated rate difference damages D is above 1 so the processor 30 does not detect a leak of the first tire 12. However, if the same number were true except for the fact that the accumulated rate difference damage D of the first tire 12 versus the fourth tire 24 were 1.2, then it would be the case that 2 of the D values were greater than 1 and the processor 30 would in that case indicate that the first tire 12 is leaking under this cumulative damage model.

Figure 12:
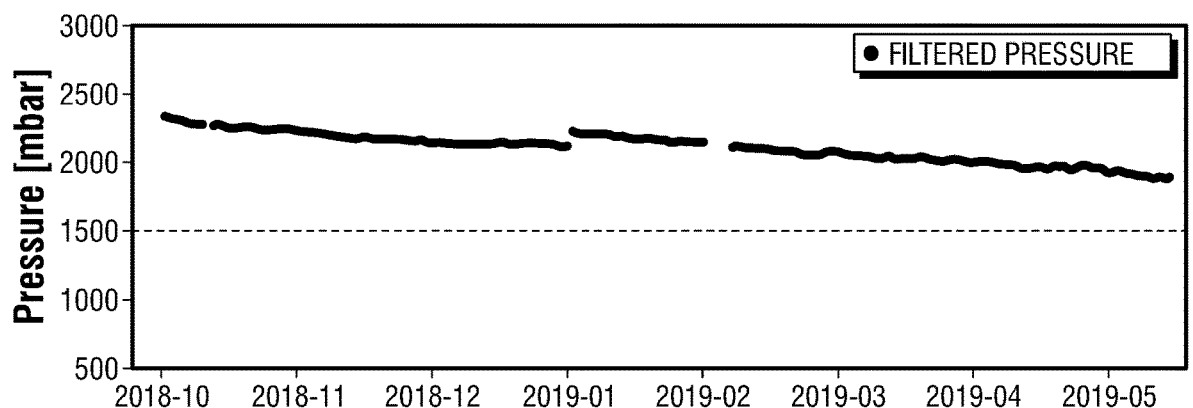
FIG. 12 is a graph of the pressure of the first tire over time showing no leak.
Figure 13:
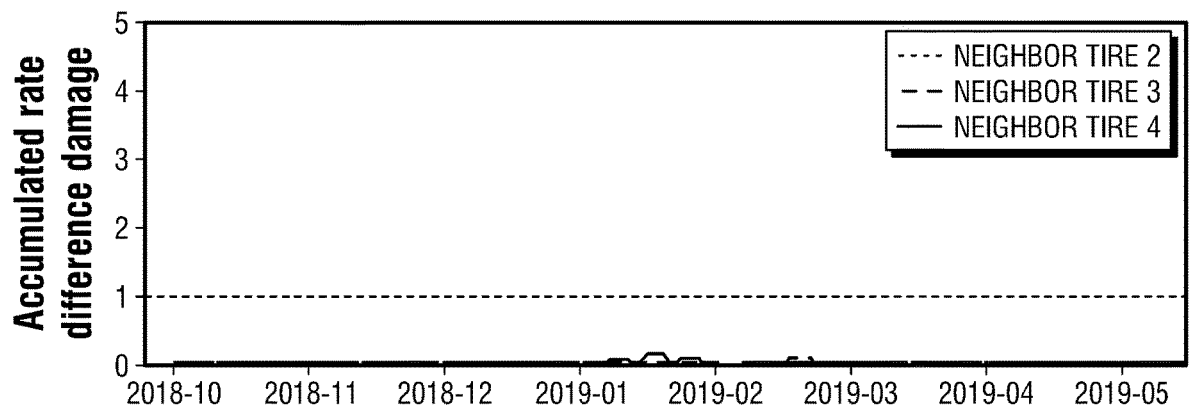
FIG. 13 is a graph of the cumulative damage model of the first tire of FIG. 12 in which none of the compared tires have a damage rate greater than 1 indicating the first tire of FIG. 12 is not leaking.

Another example of the processor 30 detecting a leak through the cumulative damage model is presented below in which the previous process is executed for the first tire 12 in view of the second, third and fourth tires 16, 20, 24. FIG. 12 shows an example of the filtered pressure versus time for the first tire 12 in which the pressure does not drop below 1500 millibars, and the first tire 12 thus is not leaking. The pressure does trend down over time which may indicate natural pressure loss of the first tire 12 or could indicate a slow leak of the tire 12. However, using the accumulated rate difference damages D of the first tire 12 in view of the second, third, and fourth tires 16, 20, 24 no such leak is detected. FIG. 13 shows the accumulated rate difference damages D for these three tires 16, 20, 24 over the same amount of time as FIG. 12 and none of the D values is over 1. Since none of them go over 1, the processor 30 indicates that the first tire 12 is not leaking.

Figure 14:
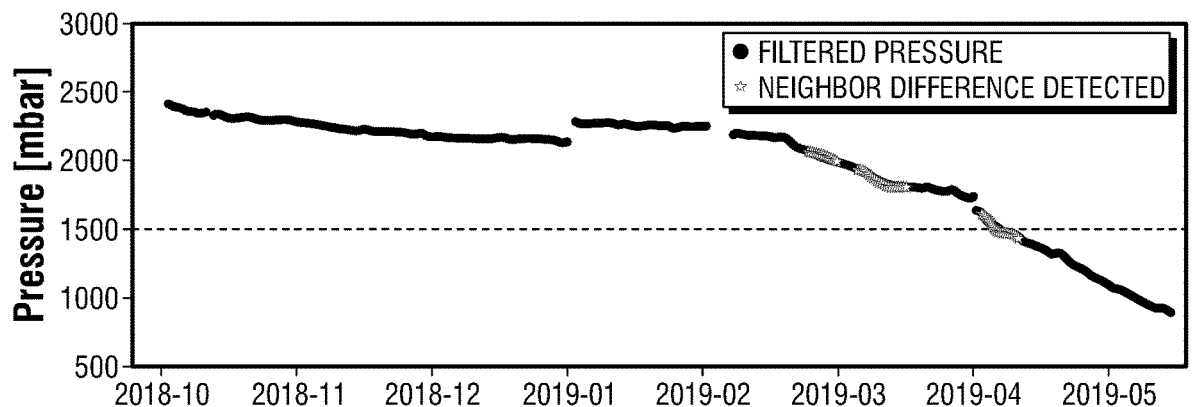
FIG. 14 is a graph of the pressure over time of a first tire showing a leak of the first tire.
Figure 15:
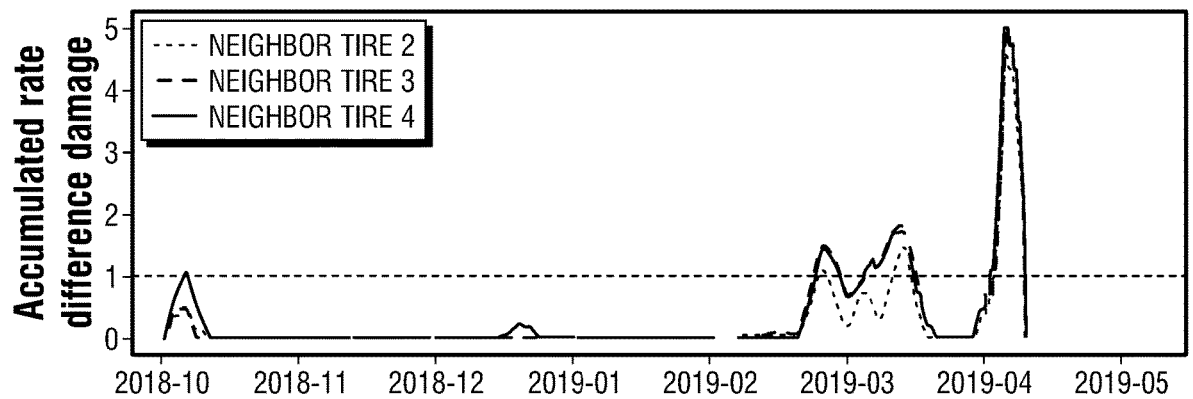
FIG. 15 is a graph of the cumulative damage model of the first tire of FIG. 14 in which two or more of the compared tires have a damage rate greater than 1 indicating a leak of the first tire.

Another example is shown in FIG. 14 in which the filtered pressure versus time for the first tire 12 is again presented, only this time a leak is present in the first tire 12. As per the data presented in FIG. 14, around March of 2019 the first tire 12 begins to lose air pressure, and in April of 2019 the pressure drops below the threshold of 1500 millibar. The cumulative damage D of the first tire 12 versus the neighboring tires 16, 20, 24 is illustrated in FIG. 15. The accumulated rate difference damage D of the fourth tire 24 reaches the value of 1 around October 2018, but the damage D of the second and third tires 16, 20 does not so the processor 30 does not indicate a leak of the first tire 12 because only 1 and not 2 of the neighboring tires reaches the value of 1. Moving to the data around March 2019, it can be seen that two or even three of the damage D values exceed 1 which means that the processor 30 detects a leak of the first tire 12 at this time. The pressure of the first tire 12 in FIG. 14 is not below the 1500 millibar threshold in March 2019, so the leak that is detected may be a slow leak of the first tire 12. In April of 2019, the cumulative damage D of the first tire 12 versus all three of the other tires 16, 20, 24 are all above 1 which again means that the processor 30 has detected a leak of the first tire 12 under the neighbor tire comparison model. The filtered pressure of the first tire 12 as shown in FIG. 14 is below the 1500 millibar threshold in April of 2019 to verify that in fact the first tire 12 is leaking.

The processor 30 can also repeat this same analysis for the second tire 16 in that it may perform the neighbors tire damage comparison for the second tire 16 in view of the first tire 12, the third tire 20, and the fourth tire 24 to see if the second tire 16 is leaking under this model. Also, the third tire 20 may be analyzed by the processor 30 in view of the neighboring first, second and fourth tires 12, 16, 24 to determine if the third tire 20 is leaking under this particular damage model. Finally, the fourth tire 24 can be looked at to determine if it is leaking by comparing it to the first, second and third tires 12, 16, 20 under the previously discussed accumulated damage model. The processor 30 may thus be able to study all four tires 12, 18, 20, 24 to determine if any of them is leaking in view its neighbors according to this neighbor tire comparison analysis. Although described as requiring at least 2 of the tires 18, 20, 24 to cross the accumulated rate difference line of 1 to detect a leak, in other embodiments at least one of the tires 18, 20, 24 only need to cross the accumulated rate difference line 1 for the processor 30 to signal a leak of the first tire 18, and in yet other embodiments all three of the tires 18, 20, 24 must cross the accumulated rate difference line 1 for the processor 30 to signal a leak of the first tire 18 under the accumulated rate damage tire comparison model.

The present system can alert the operator of the vehicle if a tire leak exists by either the damage model comparing the tire to other tires on the vehicle, or by the discussed natural leak model that utilizes temperature data, or by a combination of both of these two methods. In this regard, it may be the case that to minimize the rate of false positives both of these method can be combined. The processor 30 may identify a leak only when at the same time t the processor 30 determines one of the tires 12, 18, 20, 24 is leaking under both the damage model tire comparison and by the natural leak model utilizing temperature data. If a leak at the same time t is detected by one of these methods, but not both, then the processor 30 does not signal that a leak is taking place. However, other embodiments exist in which the processor 30 may signal a leak when a leak is detected by either the natural leak model utilizing temperature data or by the damage model tire comparison. When the processor 30 determines that a leak is taking place, this information can be sent to the vehicle display 32 and/or the hand held display 34 to alert the user of the vehicle 10 that one or more of the tires 12, 16, 20, 24 has a leak.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

What is claimed is:

1. A system for detecting a leak, comprising:
   a first sensor that obtains pressure and temperature data from a first tire of a vehicle;
   a second sensor that obtains pressure and temperature data from a second tire of the vehicle;
   a third sensor that obtains pressure and temperature data from a third tire of the vehicle;
   a fourth sensor that obtains pressure and temperature data from a fourth tire of the vehicle;
   a processor that obtains data from the first, second, third and fourth sensors and uses a natural leak model and/or a damage comparison model to determine if the first tire is leaking, wherein:
   the natural leak model comprising:
      wherein the processor resamples the pressure measurements of the first sensor to a fixed sample rate if the pressure measurements are not all ready in a fixed sample rate, and wherein the processor calculates a set of normalized pressure readings at different times;
      wherein the processor calculates a pressure predicted for the first tire at a particular time by using the normalized pressure at a previous time, the time difference between the particular time and the previous time, and the temperature measurement of the first sensor at the particular time;
      wherein the processor calculates a prediction interval using the pressure predicted, and if the normalized pressure at the particular time falls below the prediction interval at the particular time the processor detects a leak under the natural leak model of the first tire if this remains the case for a sufficient number of future measured normalized pressures beyond the normalized pressure at the particular time; and
   wherein the damage comparison model comprising:
      wherein the processor calculates a pressure daily ratio (r(t)) for the first tire at different times, for the second tire at the different times, for the third tire at the different times, and for the fourth tire at the different times;
      wherein the processor calculates the rate(t) for the first tire by the equation $\text{rate}(t)=P(t)*(1-r(t))$ in which $P(t)$ is the pressure of the first tire at time t and $r(t)$ is the pressure daily ratio r for the first tire at the time t;
      wherein the processor calculates the rate(t) for the second tire by the equation $\text{rate}(t)=P(t)*(1-r(t))$ in which $P(t)$ is the pressure of the second tire at time t and $r(t)$ is the pressure daily ratio r for the second tire at the time t;
      wherein the processor calculates the rate(t) for the third tire by the equation $\text{rate}(t)=P(t)*(1-r(t))$ in which $P(t)$ is the pressure of the third tire at time t and $r(t)$ is the pressure daily ratio r for the third tire at the time t;
      wherein the processor calculates the rate(t) for the fourth tire by the equation $\text{rate}(t)=P(t)*(1-r(t))$ in which $P(t)$ is the pressure of the fourth tire at time t and $r(t)$ is the pressure daily ratio r for the fourth tire at the time t;
      wherein the processor calculates for the first tire an estimated number of days ($N_{days}(t)$) at different times before the first tire reaches a pressure threshold by the equation $N_{days}(t)=(P(t)-P_{thresh})/\text{rate}(t)$ in which Pthresh is a constant, $P(t)$ is the pressure of the first tire at time t, and rate(t) is the previously calculated rate(t) for the first tire;
      wherein the processor calculates rate differences at the different times between the first tire and the second tire by the equation $\text{diff}_i(t)=\text{rate}_{est}(t)-\text{rate}_i(t)$ in which $\text{diff}_i(t)$ is the rate difference between the first and second tire at time t, $\text{rate}_{est}(t)$ is the previously calculated rate(t) for the first tire at time t, and $\text{rate}_i(t)$ is the previously calculated rate(t) of the second tire;
      wherein the processor calculates rate differences at the different times between the first tire and the third tire by the equation $\text{diff}_i(t)=\text{rate}_{est}(t)-\text{rate}_i(t)$ in which $\text{diff}_i(t)$ is the rate difference between the first and third tire at time t, $\text{rate}_{est}(t)$ is the previously calculated rate(t) for the first tire at time t, and $\text{rate}_i(t)$ is the previously calculated rate(t) of the third tire;
      wherein the processor calculates rate differences at the different times between the first tire and the fourth tire by the equation $\text{diff}_i(t)=\text{rate}_{est}(t)-\text{rate}_i(t)$ in which $\text{diff}_i(t)$ is the rate difference between the first and fourth tire at time t, $\text{rate}_{est}(t)$ is the previously calculated rate(t) for the first tire at time t, and $\text{rate}_i(t)$ is the previously calculated rate(t) of the fourth tire;
      wherein the processor calculates cumulative damage of the first tire in view of the second tire by the following equation:

$$D = \sum_t c * \left(\frac{\text{diff}_i(t)}{N_{days}(t)}\right)^a$$

wherein $\text{diff}_i(t)$ is the previously calculated $\text{diff}_i(t)$ rate difference between the first and second tire at time t, $N_{days}(t)$ is the previously calculated first tire estimated number of days ($N_{days}(t)$) at time t, wherein c and a are constants, and wherein the summation is performed over at least the last 1 day of time;

wherein the processor calculates cumulative damage of the first tire in view of the third tire by the following equation:

$$D = \sum_t c * \left(\frac{diff_i(t)}{N_{days}(t)}\right)^a$$

wherein $diff_i(t)$ is the previously calculated $diff_i(t)$ rate difference between the first and third tire at time t, $N_{days}(t)$ is the previously calculated first tire estimated number of days ($N_{days}(t)$) at time t, wherein c and a are constants, and wherein the summation is performed over at least the last 1 day of time;
wherein the processor calculates cumulative damage of the first tire in view of the fourth tire by the following equation:

$$D = \sum_t c * \left(\frac{diff_i(t)}{N_{days}(t)}\right)^a$$

wherein $diff_i(t)$ is the previously calculated $diff_i(t)$ rate difference between the first and fourth tire at time t, $N_{days}(t)$ is the previously calculated first tire estimated number of days ($N_{days}(t)$) at time t, wherein c and a are constants, and
wherein the summation is performed over at least the last 1 day of time;
wherein the processor compares the cumulative damage D of the first tire in view of the second tire, the first tire in view of the third tire, and the first tire in view of the fourth tire to an accumulated rate limit to detect a leak of the first tire under the damage comparison model; and
a display that outputs the detected leak of the first tire by the processor.

2. The system as set forth in claim 1, wherein the processor only outputs the detected leak of the first tire if the processor detects the leak of the first tire at the particular time under the natural leak model and also detects the leak of the first tire under the damage comparison model at the same particular time.

3. The system as set forth in claim 1, wherein the summation to calculate the cumulative damage of the first tire in view of the second tire is performed over the last 5 days of time;
wherein the summation to calculate the cumulative damage of the first tire in view of the third tire is performed over the last 5 days of time;
wherein the summation to calculate the cumulative damage of the first tire in view of the fourth tire is performed over the last 5 days of time.

4. The system as set forth in claim 1, wherein the processor calculates the cumulative damage of the first tire in view of the second tire by setting the constant c to be $\frac{1}{10}$ and by setting the constant a to be 0.4;
wherein the processor calculates the cumulative damage of the first tire in view of the third tire by setting the constant c to be $\frac{1}{10}$ and by setting the constant a to be 0.4; and
wherein the processor calculates the cumulative damage of the first tire in view of the fourth tire by setting the constant c to be $\frac{1}{10}$ and by setting the constant a to be 0.4.

5. The system as set forth in claim 1, wherein the processor detects a leak of the first tire under the damage comparison model if at least two of the cumulative damage D of the first tire in view of the second tire, the cumulative damage D of the first tire in view of the third tire, and the cumulative damage D of the first tire in view of the fourth tire are greater than 1.

6. The system as set forth in claim 1, wherein the pressure measurements of the first sensor are not in a fixed sample rate and the processor resamples the pressure measurements of the first sensor by calculating median values of the pressure measurements of the first sensor over one minute increments of time.

7. The system as set forth in claim 1, wherein in the natural leak model the processor calculates the set of normalized pressure readings by the following equation:

$$P_{normalized} = P_{measured} * \frac{T_{cold} + 273.15}{T_{measured} + 273.15}$$

Wherein $T_{measured}$ is the temperature measured by the first sensor at the particular time, wherein $P_{measured}$ is the pressure measured by the first sensor at the particular time, and wherein $T_{cold}$ is 17 degrees Celsius.

8. The system as set forth in claim 7, wherein the processor removes outliers from the set of normalized pressure readings by dropping a normalized pressure reading if the normalized pressure reading is greater than 0.1 bar in magnitude from a previous or subsequent normalized pressure reading.

9. The system as set forth in claim 1, wherein in the natural leak model the processor segments the normalized pressure readings from the first sensor by removing normalized pressure readings indicative of a rapid air pressure leak of the first tire, and by starting a new segment when the normalized pressure readings are indicative of a reinflation of the first tire.

10. The system as set forth in claim 9, wherein the processor filters the normalized pressure readings in the segments from the first sensor by calculating a rolling average over a prior period and assigning this rolling average as a filtered pressure for the particular time.

11. The system as set forth in claim 10, wherein the rolling average is the average of all the normalized pressures from the first sensor for the prior 24 hour period from the particular time.

12. The system as set forth in claim 1, wherein the processor calculates the pressure predicted by the following equation:

$$Ppredicted(t) = P(t - \Delta_t) * (1 - \alpha(t) * \Delta_t)$$

$$\text{with } \alpha(t) = \frac{1}{\tau_0} * e^{-\frac{E}{T(t) + 273.15}}$$

wherein T(t) is the temperature of the first tire, wherein $P(t-\Delta_t)$ is the pressure of the first tire at a previous data point, wherein $\Delta_t$ is the time between readings of the first sensor, wherein E and $\tau_0$ are constants.

13. The system as set forth in claim 12, wherein E is 5800 Kelvin, and wherein to is $\frac{1}{3}$.

14. The system as set forth in claim 1, wherein in the natural leak model the processor calculates the prediction interval using the following equation:

$$IP_{99\%}(t)=[P_{predicted}(t)-2.576*\sigma;\ P_{predicted}(t)+2.576*\sigma]$$

wherein $\sigma$ is 40 mbar, and wherein the processor detects the leak of the first tire if the $P_{predicted}$ falls below the lower limit of the $IP_{99\%}(t)$ for at least 20 consecutive data points of $P_{predicted}$.

15. The system as set forth in claim 10, wherein the processor calculates a set of normalized pressure readings at different times from the data supplied by the second sensor, wherein the processor segments the normalized pressure readings from the second sensor by removing normalized pressure readings indicative of a rapid air pressure leak of the second tire, and by starting a new segment when the normalized pressure readings are indicative of a reinflation of the second tire, and wherein the processor filters the normalized pressure readings in the segments from the second sensor by calculating a rolling average over a prior period and assigning this rolling average as a filtered pressure for the particular time for the second tire;

wherein the processor calculates a set of normalized pressure readings at different times from the data supplied by the third sensor, wherein the processor segments the normalized pressure readings from the third sensor by removing normalized pressure readings indicative of a rapid air pressure leak of the third tire, and by starting a new segment when the normalized pressure readings are indicative of a reinflation of the third tire, and wherein the processor filters the normalized pressure readings in the segments from the third sensor by calculating a rolling average over a prior period and assigning this rolling average as a filtered pressure for the particular time for the third tire;

wherein the processor calculates a set of normalized pressure readings at different times from the data supplied by the fourth sensor, wherein the processor segments the normalized pressure readings from the fourth sensor by removing normalized pressure readings indicative of a rapid air pressure leak of the fourth tire, and by starting a new segment when the normalized pressure readings are indicative of a reinflation of the fourth tire, and wherein the processor filters the normalized pressure readings in the segments from the fourth sensor by calculating a rolling average over a prior period and assigning this rolling average as a filtered pressure for the particular time for the fourth tire;

wherein the pressures used in the damage comparison model by the processor are the filtered pressure of the first tire, the filtered pressure of the second tire.

16. The system as set forth in claim 1, wherein the display is built into the vehicle, and wherein the processor is remote from the vehicle and not in engagement with the vehicle.

* * * * *